US008734757B2

(12) United States Patent
du Plessis et al.

(10) Patent No.: US 8,734,757 B2
(45) Date of Patent: May 27, 2014

(54) ODOR CONTROL

(75) Inventors: Chris du Plessis, West Perth (AU); Geoffery David Senior, Mount Claremont (AU)

(73) Assignee: BHP Billiton SSM Development Pty Ltd., Perth (AU)

( * ) Notice: Subject to any disclaimer, the term of this patent is extended or adjusted under 35 U.S.C. 154(b) by 0 days.

(21) Appl. No.: 12/935,966

(22) PCT Filed: Apr. 6, 2009

(86) PCT No.: PCT/AU2009/000415
§ 371 (c)(1),
(2), (4) Date: Dec. 21, 2010

(87) PCT Pub. No.: WO2009/121147
PCT Pub. Date: Oct. 8, 2009

(65) Prior Publication Data

US 2011/0150728 A1 Jun. 23, 2011

(30) Foreign Application Priority Data

Apr. 4, 2008 (AU) ................................ 2008901625
May 15, 2008 (AU) ................................ 2008902401

(51) Int. Cl.
*B01D 11/00* (2006.01)
*B01F 1/00* (2006.01)

(52) U.S. Cl.
USPC ........................................... 423/658.5; 423/1

(58) Field of Classification Search
USPC .................................................. 423/658.5, 1
See application file for complete search history.

(56) References Cited

U.S. PATENT DOCUMENTS

| | | | | | |
|---|---|---|---|---|---|
| 3,705,098 | A | * | 12/1972 | Shepherd et al. | 210/759 |
| 4,011,304 | A | * | 3/1977 | Mancini et al. | 423/576.6 |
| 4,597,857 | A | * | 7/1986 | Norrgran et al. | 209/166 |
| 7,152,741 | B2 | * | 12/2006 | Jara et al. | 209/166 |
| 2003/0231995 | A1 | * | 12/2003 | Jara et al. | 423/140 |

FOREIGN PATENT DOCUMENTS

| | | | |
|---|---|---|---|
| CA | 1104274 | | 6/1981 |
| CA | 1238430 | | 6/1988 |
| FR | 2495500 | | 6/1982 |
| GB | 2182587 | | 5/1987 |
| JP | 71033208 | B * | 10/1968 |
| SU | 692623 | | 10/1979 |
| SU | 711170 | | 1/1980 |

OTHER PUBLICATIONS

International Search Report for WO 2009/121147 dated Jun. 29, 2009.

* cited by examiner

*Primary Examiner* — Melissa Stalder

(74) *Attorney, Agent, or Firm* — Brinks Gilson & Lione; G. Peter Nichols

(57) ABSTRACT

A process for producing a mineral concentrate product that at is at least a substantially odor-free product comprises any one or more than one of (a) organics removal by (i) treatment of a froth product slurry containing floated mineral particles to remove organic compounds from the mineral particles and/or (ii) thermal treatment, and (b) addition of chemicals to prevent residual organic compounds on mineral concentrates being converted to odorous compounds, particularly while the concentrates are being stock-piled or transported.

7 Claims, 4 Drawing Sheets

ODOR CONTROL

This application claims priority to PCT Application Serial No. PCT/AU2009/000415 filed Apr. 6, 2009 published in English on Oct. 8, 2009 as PCT WO 2009/121147; to Australian Application No. 2008/901625 filed Apr. 4, 2008, and to Australian Application No. 2008902401 filed May 15, 2008, the entire contents of each are incorporated herein by reference.

The present invention relates to minimising odours associated with mineral concentrates produced from a mined ore.

The odour mitigation strategy of the present invention is concerned with eliminating altogether or at least significantly reducing the organic loading on minerals concentrates of a mined ore.

The present invention relates more particularly, although by no means exclusively, to minimising odours associated with sulphide mineral concentrates produced from a mined ore.

The present invention relates more particularly, although by no means exclusively, to minimising odours associated with nickel sulphide mineral concentrates produced from a mined ore.

The present invention makes it possible to facilitate producing a mineral concentrate product, particularly a nickel concentrate product, which is at least a substantially odour-free product and can be transported as such from a production site to a remote location.

In particular, although by no means exclusively, the present invention makes it possible to produce a mineral concentrate product, particularly a nickel concentrate product, that is at least a substantially odour-free product.

The issue of odours being generated at nickel sulphide flotation plants is an issue that is becoming increasingly important.

In addition, the issue of producing nickel concentrate products that generate odours when they are (a) stock-piled for any length of time, for example while waiting for transportation from a plant or a port or a rail head or while at an end-use site or (b) transported by ship or by rail, is an issue that is becoming increasingly important.

Organic compounds that are associated with production of nickel sulphide concentrates are a major cause of the generation of odours in flotation processing plants and in stock-piled concentrates at the plants and elsewhere.

The discussion of organic compounds, including the impact of organic compounds on generating odours in nickel sulphide concentrate production, in this specification is not to be taken as an admission of the common general knowledge in Australia or elsewhere.

The applicant has realised that, if possible, it is preferable to deal with organic compounds before the concentrates, with which they are associated, are filtered or dried.

More particularly, the present invention is based on a realisation that, if possible, it is more effective to deal with organic compounds when concentrates are in a slurry form, for example as a froth product slurry, or desorbed into solution within a nickel sulphide flotation plant rather than after the concentrates are filtered and dried.

It is emphasised that the present invention is not confined to treatment of slurries or solutions in a nickel sulphide flotation plant and also extends to treatment options on moist or dried concentrates produced in such plants at the plants or at other locations.

The present invention is applicable to green field minerals concentrate plants, such as nickel sulphide concentrates plants.

The present invention is also applicable to existing mineral concentrate plants, such as a nickel sulphide concentrate plants, and preferably with modifications to the plants being kept to a minimum. In such applications, the odour mitigation strategy of the present invention is a “retro-fit” strategy that can be implemented, for example, at a minerals concentrate plant, such as a nickel sulphide concentrate plant, or elsewhere.

In both green field and retro-fit applications, the present invention is a process for producing a mineral concentrate product that at is at least a substantially odour-free product that can be carried out at a minerals concentrate plant, such as a nickel sulphide flotation plant, or at another site elsewhere, that comprises any one or more than one of the following three process options:

(a) organics removal by treatment of a froth product slurry containing floated mineral particles to remove organic compounds from the mineral particles and thereby facilitating forming a concentrate of the mineral particles with a low organic compound loading;

(b) organics removal by thermal treatment, particularly organics removal by thermal treatment of mineral concentrates using dryers (including purpose built dryers or thermal desorption and destruction facilities) at a minerals concentrate plant, such as a nickel sulphide flotation plant, or elsewhere; and (c) addition of chemicals to prevent residual organic compounds on mineral concentrates being converted to odorous compounds, particularly while the concentrates are being stock-piled or transported.

In both green field and retro-fit applications, the present invention is a process for producing a mineral concentrate from a mined material that comprises:

(a) floating selected mineral particles from a slurry of the mined material and forming a wet concentrate in the form of a froth product slurry containing the floated mineral particles, with the flotation step including adding a collector in the form of an organic compound to the slurry of the mined material that adsorbs onto selected mineral particles and promotes the flotation of the mineral particles, and (b) treating the froth product slurry containing the floated mineral particles to remove the organic compound from the mineral particles and thereby facilitate forming a concentrate of the mineral particles with a low organic compound loading.

The treatment step (b) may remove the organic compound by destroying the organic compound.

In such a situation, preferably the process comprises separating the mineral particles from the froth product slurry, with the separated mineral particles forming the concentrate with the low organic compound loading.

For example, the treatment step (b) may comprise oxidising the organic compound.

More particularly, the treatment step (b) may comprise supplying $SO_2$ and air to the slurry to oxidize the organic compound.

Other suitable oxidants include, by way of example, ferric iron (or chelated ferric iron), Caro’s acid, permanganate, hydrogen peroxide, ozone, hypochlorite, and chlorine.

Alternatively, the treatment step (b) may remove the organic compound by desorbing the organic compound from the mineral particles.

In such a situation, preferably the process comprises separating the mineral particles from the froth product slurry (and the desorbed organic compounds), with the separated mineral particles forming the concentrate with the low organic compound loading.

In situations where there is no chemical change in the organic compounds as a consequence of the treatment step that adversely affects the functionality of the compound as a collector, the process may comprise using the separated organic compound again in the flotation step.

By way of example, the treatment step (b) may comprise an alkaline desorption step that comprises increasing the pH of the froth product slurry containing the floated mineral particles to cause desorption of the organic compound from the mineral particles. The applicant has found in research work that increasing the pH of a froth product slurry containing floated nickel sulphide particles to at least pH 10 and preferably pH 11-12 caused desorption of an organic compound in the form of a xanthate collector from nickel sulphide particles. The treatment step may be carried out at ambient temperature or with the froth product slurry heated to a higher temperature.

The applicant has found in research work that carrying out the alkaline desorption step on a heated froth product slurry containing floated nickel sulphide particles enhances desorption of the organic compound.

The alkaline desorption step may comprise heating the froth product slurry containing floated nickel sulphide particles.

In situations where the organic compound is a xanthate collector, the alkaline desorption step may comprise heating the froth product slurry containing floated nickel sulphide particles to a temperature of at least 50° C.

Amongst other things, the applicant has found in research work that the rate and extent of desorption depend on the percent solids in the froth product slurry containing the floated mineral particles. In the case of a xanthate collector as the organic compound, desorption was rapid with the xanthate concentration in solution typically reaching a maximum value in less than an hour.

The applicant has further found in research work on xanthate collectors that it is beneficial to avoid the formation of dixanthogen in solution by maintaining conditions in the froth product slurry below the formation potential for this compound. The formation potential of dixanthogen can be calculated from the relationship given by Hepel and Pomianowshi (1977):

$$Eh=-0.070-0.0591 \log [X^-]$$

Hence, when the organic compound is a xanthate collector, the alkaline treatment step may comprise maintaining the Eh of the froth product slurry containing the floated mineral particles below the formation potential of dixanthogen to enhance the desorption of the organic compound from the mineral particles.

The Eh may be maintained below the formation potential of dixanthogen by adding a suitable reductant such as dithionite or ammonium sulphide or any other compound known to be a strong reductant.

Alternatively the concentration of the xanthate collector can be reduced by the addition of an oxidant to destroy the xanthate collector including ferric iron (or chelated ferric iron), Caro's acid, permanganate, hydrogen peroxide, ozone, hypochlorite, chlorine or any other compound known to be a strong oxidant.

By way of further example, the treatment step (b) may comprise heating the froth product slurry containing the floated mineral particles to cause desorption of the organic compound from the mineral particles. The applicant has found in research work that desorption of a xanthate collector from nickel sulphide particles in a froth product slurry can occur at ambient temperature and when the froth product slurry is heated to temperatures up to at least 50° C.

By way of further example, the treatment step may comprise a combination of any two or more of the alkaline desorption step and any one or more of the enhancement options of Eh adjustment, heating the froth product slurry containing floated mineral particles, and the addition of oxidants.

The present invention is described further with reference to the accompanying drawings, of which:

FIG. 1 which is a flowsheet of a typical minerals processing plant for producing a nickel sulphide concentrate;

Figure 1:
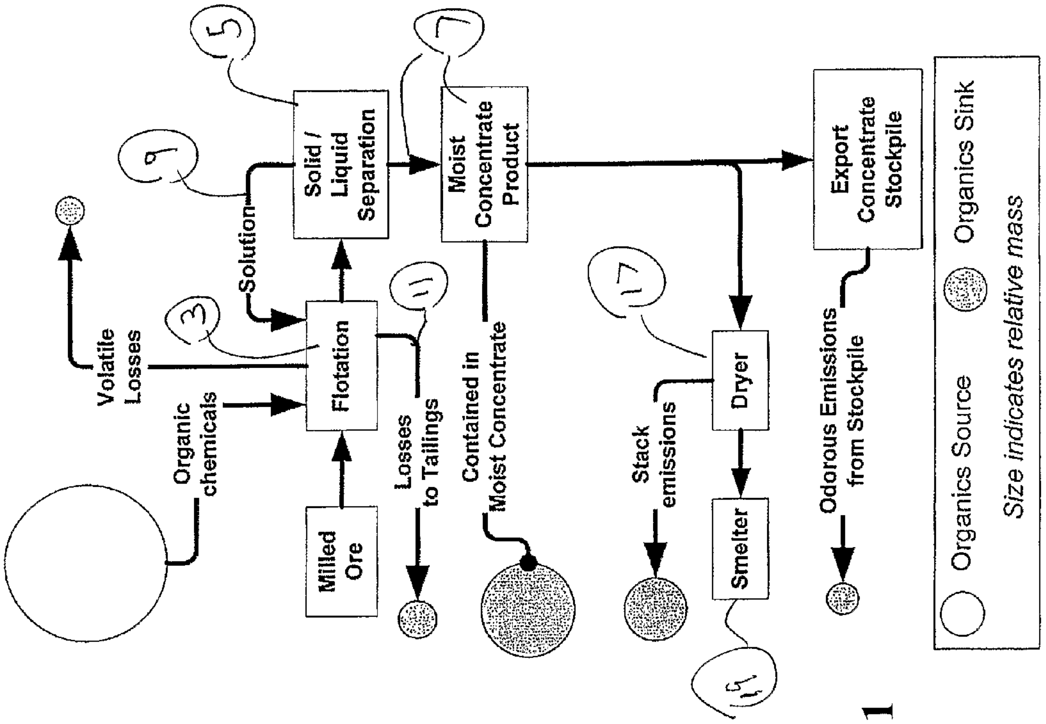

With reference to FIG. 1, a slurry of milled ore and water and standard additives is subjected to a flotation process in a series of flotation cells 3. The floated sulphide mineral particles that are discharged from the flotation cells 3 in a froth product slurry are subjected to some form of solids/liquid separation 5. In some instances, this may also be followed by a filtration step. The result is (a) a moisture-containing mineral concentrate product stream 7 and (b) a return solution stream 9 for the flotation process. The flotation process also produces a tailings stream 11 to which the bulk of the gangue minerals and a portion of the slurry flow reports.

Figure 2:
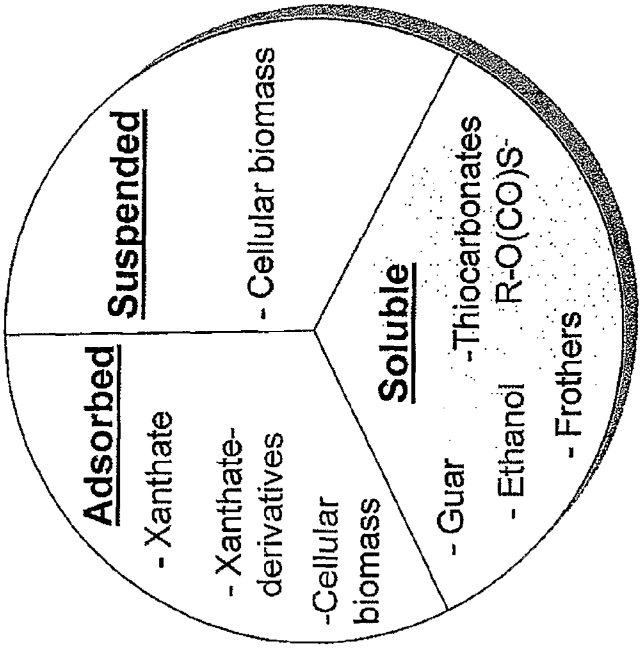
FIG. 2 is a pie chart that shows the range of chemical species and phases in which organic compounds can be present in a froth product slurry in the typical minerals processing plant.

Organic compounds can be present in the froth product slurry in the typical minerals processing plant described above with reference to FIG. 1 in a variety of chemical species and phases, i.e. adsorbed to surfaces, soluble in solution and in insoluble suspended particulate form—see FIG. 2.

Organic compounds enter the typical minerals processing plant described above with reference to FIG. 1 by chemical addition to the flotation process or from recycled process water. A portion of the organic compounds (typically, a xanthate and derivatives) are adsorbed onto sulphide minerals particles and promote flotation of the particles and are carried with the floated particles in the froth product slurry discharged from the flotation cells 3. Some organic compounds may remain in solution and some may desorb and/or decompose from an adsorbed form, thereby also reporting to the return solution stream. Some organic compounds may directly be volatilized or may be decomposed, by a variety of mechanisms, and then be lost to atmosphere as gaseous species. Organic compounds associated with the gangue minerals (i.e. suppressants) may report mainly to tailings. Some organic compounds may be metabolized to $CO_2$ and evaporated, while a portion may be metabolically converted and incorporated into bacterial biomass due to microbial-conducive growth conditions prevailing within the circuit. Biomass may have a similar destination as the reagent carbon, i.e. a portion of the biomass may be adsorbed onto the mineral concentrate product and gangue minerals, while the remainder remains non-attached as cellular particulates suspended in solution.

Adsorbed organic compounds, both in chemical form and as adsorbed biomass, in the typical minerals processing plant described above with reference to FIG. 1 are carried with the floated sulphide mineral particles in the froth product slurry that is discharged from the flotation cells 3 and are transferred to the solid/liquid separation step 5 and form part of the mineral concentrate product stream 7 produced in the solid/liquid separation step 5.

The proportion of the organic compounds reporting to the concentrate product formed from the mineral concentrate product stream in the typical minerals processing plant described above typically depends upon the following:

(a) the number of counter-current decantation (CCD) washing stages, (b) whether a filtration step is employed and, if so, whether the filtrate is recycled to the flotation process or transferred to a separate process circuit, (c) the moisture content of the concentrate product stream; and (d) whether a washing step during filtration is employed.

Typically, the more CCD washing steps and filtration that is available at a mineral processing plant, the more opportunity for separating soluble organic compounds from a final concentrate product stream.

Typically, such CCD washing steps and filtration also allow for some desorption of adsorbed organic compounds to occur and, thereby, to be separated from the final concentrate product.

Usually, most of the added organic compounds that produce odour exit the typical mineral processing circuit described above with reference to FIG. 1 via the moist mineral concentrate product stream 7 (i.e. either attached to mineral particle surfaces or contained with the associated moisture).

As is described above, the organic compound loading associated with the concentrate product has a direct influence on the potential for volatile odour generation, either from stockpiles of moist concentrate product or during concentrate drying in dryers 17 prior to smelting in smelters 19. A quantification of the organic mass balance within a mineral processing circuit may be a key prerequisite to implementing an odour mitigation strategy of the present invention.

The organic compounds in the return solution stream 9 that are separated from the concentrate product stream 7 in the solid/liquid separation step 5 shown in FIG. 1 may be disposed of or treated by a variety of conventional wastewater treatment options. Importantly, by this approach the organic compounds are dealt with on-site and do not leave the mineral processing plant with a concentrate product.

By comparison, the approach to allow organic compounds to report to mineral concentrates may pose difficulties at dryers 17 (as pre-treatment to smelting) or during stockpiling, transport and handling of the moist concentrate.

In the case of dryers 17, there may be situations where only a portion of the organic compounds, which are adsorbed onto or are associated with moist concentrate dryer feed, are volatilized. In a volatile form these organic compounds and their decomposition products are significantly more difficult to capture and to contain within a confined dryer site. Such volatiles often have very low odour thresholds and are considerably more likely to impact on neighbouring communities than is the case for organic compounds that are dealt with in soluble form within the confines of a mineral processing plant. While organic-removal in dryers is potentially useful, its use as the sole and primary organic attenuation methodology is not advocated unless operational factors such as temperature and residence time make it possible to totally desorb and destroy the organic compounds. Where this is not possible, the use of dryers as a secondary organic attenuation process, following solution-based organic attenuation, is preferred.

The organic compounds that are not removed from an export concentrate (i.e. neither treated by solution-based attenuation nor drying) can be the most problematic. These organic compounds can give rise to highly odorous emissions, by a variety of mechanisms. Such emissions can occur after a concentrate product has left a controlled mineral processing environment. Odours can emanate from stockpiles during, storage, handling, transport, or off-loading at customer destinations. Such uncontrolled emissions pose the greatest risk for collateral impact on communities.

Figure 3:
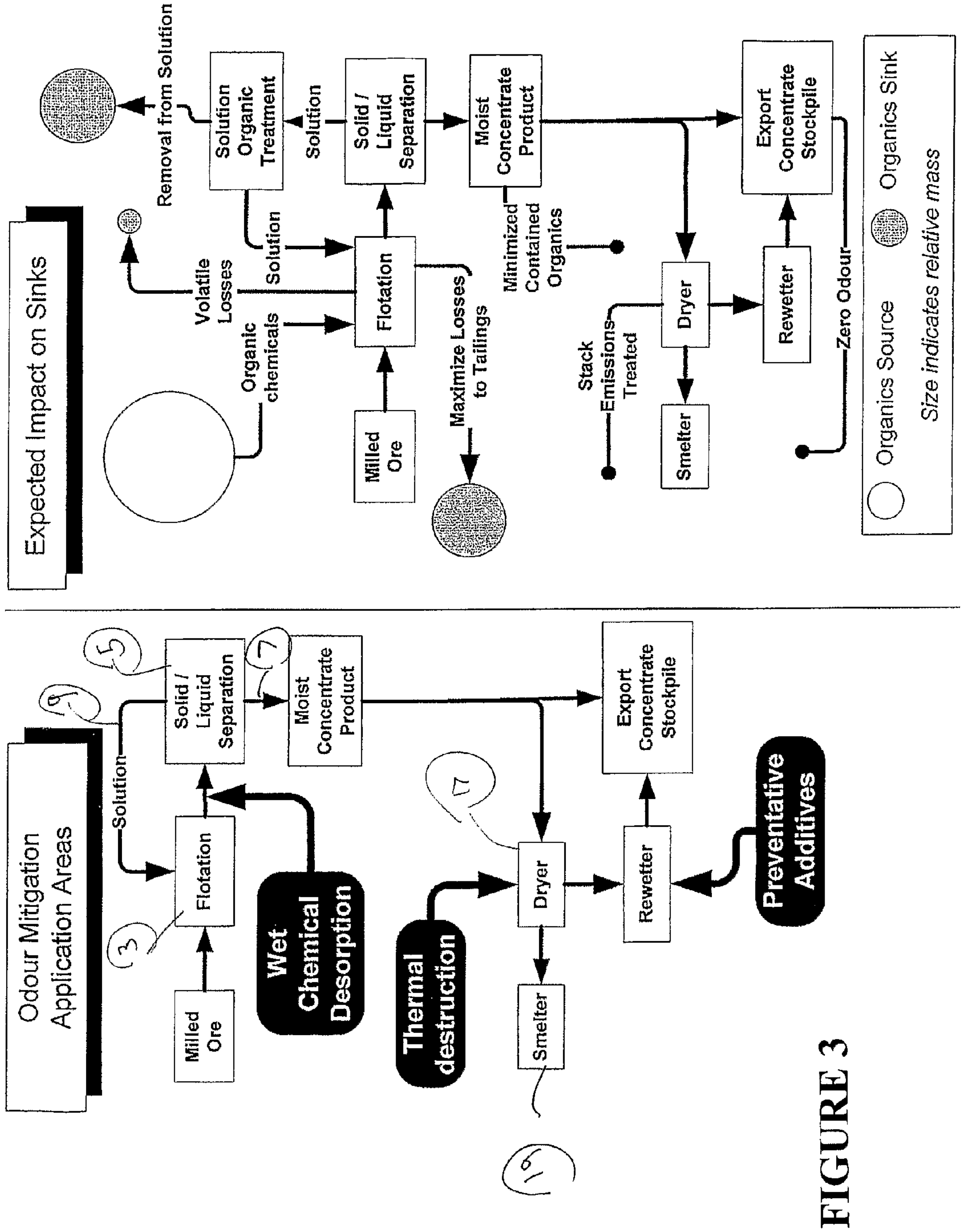
FIG. 3 is a flowsheet of a typical minerals processing plant for producing a nickel sulphide concentrate that shows options for removing/destroying organic compounds.

As is indicated above, as applied as a retro-fit to a typical minerals processing flotation plant such as that shown in FIG. 1, the present invention preferably comprises one or more than one of the three process options shown in FIG. 3:

(a) removal of the organic compounds from sulphide minerals particles in the froth product slurry that is discharged from the flotation cells 3;

(b) organics removal by thermal treatment of sulphide minerals concentrates using existing dryers 17 (or purpose built dryers or thermal desorption and destruction facilities) at the nickel sulphide flotation plant or elsewhere; and (c) addition of chemicals to prevent residual organic compounds on sulphide minerals concentrates being converted to odorous compounds, particularly while the concentrates are being stock-piled or transported.

The areas in which each of the above process options can be used in the typical sulphide minerals processing plant shown in FIG. 1 (by retro-fit) and in downstream operations on- or off-site, as well as the overall expected impact on the various sinks for organic compound removal from the mineral processing plant circuit, is summarized in FIG. 3.

In particular, FIG. 3 indicates that the option of wet chemical desorption which is discussed further hereinafter can be carried out on the floated sulphide mineral particles in the froth product slurry upstream of the solid/liquid separation step 5, with the solid/liquid separation step 5 taking the desorbed organic compounds into the return solution stream 9 so that the moisture containing mineral concentrate product stream 7 is at least substantially free of organic compounds.

It is noted that although a smelter 19 is indicated in FIG. 3, provision is made for the entire smelter feed to be diverted for export purposes.

The above process options are discussed further below.

(a) Removal from the Froth Product Slurry

One option to remove the organic compounds is to destroy the compounds altogether with oxidants, for example by supplying $SO_2$ and air to the slurry. Other suitable oxidants include, by way of example, ferric iron (or chelated ferric iron), Caro's acid, permanganate, hydrogen peroxide, ozone, hypochlorite, and chlorine.

Another option to remove the organic compounds comprises (i) wet chemical desorption of organic compounds from sulphide minerals particles in the froth product slurry that is discharged from the flotation cells 3 and ii) separation of the froth product slurry (and desorbed organic compounds) and the sulphide minerals particles whereby the separated sulphide mineral particles form a concentrate stream 7 with a low loading of organic compounds. This option may include recycling of separated organic compounds to the flotation process or treatment and removal of these organic compounds from the return stream if they are no longer functional flotation chemicals.

The wet chemical desorption is advantageously carried out by way of example on the floated sulphide mineral particles in the froth product slurry upstream of the solid/liquid separation step 5 shown in FIG. 1, with the solid/liquid separation step 5 taking the desorbed organic compounds into the return solution stream 9 so that the moisture containing mineral concentrate product stream is at least substantially free of organic compounds.

Wet desorption of organic compounds from sulphide mineral particles into solution in the froth product slurry can be achieved, for example, by adjusting the pH of the slurry so that the slurry is alkaline.

When xanthates and related organic compounds are used in the flotation process, the target pH for such an alkaline desorption step is at least pH 10 and preferably pH 11-12, as this has been shown by the applicant in research work to result in rapid and comprehensive desorption of xanthates and related organic compounds. A reaction time of usually less than an hour and sometimes as short as 5 minutes has been found in the research work to be sufficient for exposure to this controlled pH.

In addition, the research work has shown that the treatment step can be carried out at ambient temperature or with the slurry heated to higher temperatures. Temperatures of at least 50° C. have been found to be particularly effective in enhancing the alkaline desorption step.

The alkaline desorption step may be further enhanced by Eh adjustment of the slurry, for example by the addition of dithionite or ammonium sulphite, to lower the Eh below a threshold value for the formation of an undesirable dixanthogen.

A suitable location for such a desorption step (within the mineral processing plant circuit) will need to be determined for each mineral processing site due to different prevailing conditions and flow sheets.

Other important considerations to implementing the desorption process are:

(i) Water quality—High pH conditions will result in precipitation of magnesium as a hydroxide. Magnesium precipitation will lead to undesirable contamination of a mineral product. The pH modification, therefore, preferably should not be conducted in process water containing high magnesium concentrations. The absence of magnesium is not only important from a nickel concentrate product contamination point of view, but also because of its impact on lime ($Ca(OH)_2$) and sodium hydroxide consumption during pH adjustment.

(ii) Solid liquid separation—For each mineral processing plant, preferably optimal use should be made of available solid/liquid separation processes (including thickeners, CCDs, and filters) in order to separate and remove the solution, into which the organic compounds have been desorbed, from the concentrate product.

(iii) Recycle point for desorption water—Once the organic compounds have been desorbed into solution and separated from the concentrate product, the desorption water should be suitably dealt with. An important consideration here is whether the desorbed organic compounds have retained functionality as collectors. This high pH, and relatively organic rich, water may either be disposed to tailings or may be returned to the mineral processing plant. If returned to the plant, suitable pH adjustment may be required. Depending on the concentration and nature of the organic compounds in solution, an organic compound treatment and removal step may also be required to prevent the build-up of organic compounds and biomass within the circuit. Such a treatment step may include conventional wastewater treatment systems, such as trickling filters.

(b) Thermal Desorption

Following wet chemical desorption of organic compounds and separation of organic compounds from sulphide mineral particles, the resultant concentrate product stream 7 may be thermally treated so that residual organic compounds are thermally desorbed using the concentrate dryer 17 (or other suitable dryers or thermal desorption and destruction facilities—not shown) facilities in the mineral processing plant shown in FIG. 3.

The use of drying to remove residual organic compounds after wet chemical desorption and separation means that the volatile emission from dryer stacks will be reduced. Therefore, the stack emissions should not be negatively impacted. Instead, the organic compounds in stack emissions should be reduced due to solution-based organic attenuation.

Additional advantages of thermal desorption are as follows.

(i) Sterilization—Thermal desorption could destroy a majority of the bacteria associated with the concentrate and may be considered as a sterilization of the concentrate. This is beneficial because of the potential role of bacteria in odour generation within mineral stockpiles.

(ii) Site Differences—Because of the fact that various sites have different facilities for wet chemical desorption and separation of organic compounds, the effectiveness of solution-based organic attenuation may be site-specific. For this reason, thermal desorption may be more important at sites with lesser wet chemical organic removal capacity. However, at any site, the success of wet chemical desorption and separation should be assessed once implemented before making decisions about other process options.

(iii) Rewetting—Following thermal desorption the concentrate may require rewetting to the relevant Transportable Moisture Limit. Rewetting mixers that also allow for blending of additives into the concentrate may be used. Suitable rewetting mixers may be pug mills, paddle mixers, or ribbon blenders.

(c) Preventative Additives

The third element of the preferred odour mitigation strategy of the present invention, as illustrated in FIG. 3, is the use of preventative additives.

The rationale for the use of additives is to prevent the occurrence of conditions that may give rise to odour-generation, in the event that trace residual organic compounds are present or are inadvertently re-introduced.

Specifically, the additives may be selected to prevent any one or more of: (a) a reduction in pH below 9, (b) anaerobic (low redox potential) conditions, and (c) increased temperature in the concentrate stockpile.

Additives to achieve these objectives include the following additives.

(i) Lime, $Ca(OH)_2$—The addition of lime (to a target pH of 11) has a number of preventative impacts. Lime addition rates may be in a range of 4-7 kg per ton, depending on the specific concentrate. Liming will prevent low pH conditions that are known to the applicant to be conducive to odour generation. In addition, mineral sulphide oxidation is inhibited at high pH thus also preventing heat generation. This, in turn, also prevents an increase in stockpile temperature and thus eliminates the thermal mechanism of odour generation. Lastly, the high pH may also inhibit microbial activity which is severely inhibited at pH levels above 10, and thus eliminate the bacterial route to odour generation.

(ii) Nitrate—The addition of nitrate (as either sodium, or calcium nitrate) may buffer the redox potential and prevent stockpile conditions becoming reducing. This, in turn, may prevent the anaerobic mechanism of odour generation. Nitrate is soluble at high pH and has an added advantage that its use as an electron acceptor (i.e. reduction to N2), if occurred, may result in acid consumption—thus also acting as a pH buffer upon reaction. The suggested nitrate addition rate is 2.5 kg per tonne (if added as sodium nitrate), based on a residual organic compounds concentration of 500 g per ton. Estimated cost of added nitrate, as $NaNO_3$ is ~$1.8 per ton of concentrate. Nitrate is preferred to other oxidants such as calcium peroxide (CaO2) due to its solubility, low cost, and the fact that it does not provide oxygen in a manner that can stimulate sulphide oxidation within the heap under ambient conditions (with its subsequent detrimental impact on pH and temperature).

The two additives can be added both during rewetting (in the case of dryer-treated concentrate) or within the mineral processing plant circuit (i.e. in the filter feed tank or to the filtrate wash water, in the case of concentrate that may not be dryer-treated).

For mineral processing plant circuits, the impact of such additions on the overall process efficiency will need to be evaluated. Similarly, the impact of additives on smelter operation will need explicit consideration.

Apart from lime and nitrates, the use of a number of other additives may also be considered. These additives include the following additives.

(i) Molybdate—Molybdate may inhibit a wide range of microbial activity under reduced conditions. Unlike most other metals, molybdate is soluble at high pH. Molybdate may be applied to processing circuits where sulphate reducing conditions are suspected from causing odours, or may be added to concentrate products.

(ii) Chelated Ferric—Chelated ferric (specifically BASF's Trilon SFC 50) is a liquid product, and allows ferric to remain soluble and active as an oxidant at pH levels as high as 13. This product is used as a scrubbing reagent in high pH scrubbing liquid to remove $H_2S$ from gas streams ($H_2S$ is oxidized to elemental sulphur). The product may be used in mineral processing plant circuits to prevent solution conditions from becoming too reducing (i.e. redox potential buffering) and to react with reduced sulphur compounds where they are produced. It may also be used in high pH gas-scrubbing solutions for dryer stack gas or as an additive in concentrates to prevent low redox potential conditions occurring in stockpiles.

(iii) Activated carbon—The addition of activated carbon may be achieved during rewetting mixing. Provision for such addition may be made when selecting the most suitable mixing equipment. The role of activated carbon is to absorb odorous VOCS compounds in the event that they are generated within the mineral stockpile, thus preventing them from escaping into the atmosphere. Applications rates of 5 kg per ton are anticipated to be sufficient. This should be considered as an emergency measure and is not recommended as a primary mitigation method. Instead it may be appropriate for mitigation measures that prevent odour generation to take priority.

In addition to all of the above considerations, it is relevant to comment that routine measurement and monitoring of organic carbon concentrations, in its various formats, is not currently undertaken within mineral processing plants and is desirable. Without such monitoring the organic compound loading on a concentrate product is not quantified, and the potential odour-generation liability is not known. For this reason quantification and monitoring of organic compounds (in all its forms), both within the mineral processing plant and of the concentrate product, is a preferred component of the odour mitigation strategy of the present invention. Such information may allow an assessment of the odour-generation liability related to the organic loading associated with the concentrate. In addition, the effectiveness of measures to reduce the organic loading on the concentrate product may be assessed on a regular basis.

The following three analytical regimes are recommended. This is not an exhaustive list of analytical measurements but, instead, focuses on key parameters with practical operational importance.

1. Organic loading on the concentrate product—An analytical method may be provided that will allow for a determination of the total organic compound concentration of concentrates. This method may be a technique by which total organics are extracted from concentrates by solvents and subsequently quantified. These analyses may allow monitoring of the organic compound loading before and after the organic compound desorption step within the circuit, and in the final concentrate product. This information may be critical in determining the effectiveness of the wet chemical organic attenuation process and the organic liability associated with the concentrate product, on an ongoing basis.

2. Redox potential—Redox potential measurements may readily be taken with standard probes. The measurement may give an indication of the extent to which reducing conditions may occur within the plant slurries, such as froth flotation slurries. This measure may indicate the effectiveness of organic attenuation within the processing circuit.

Figure 4:
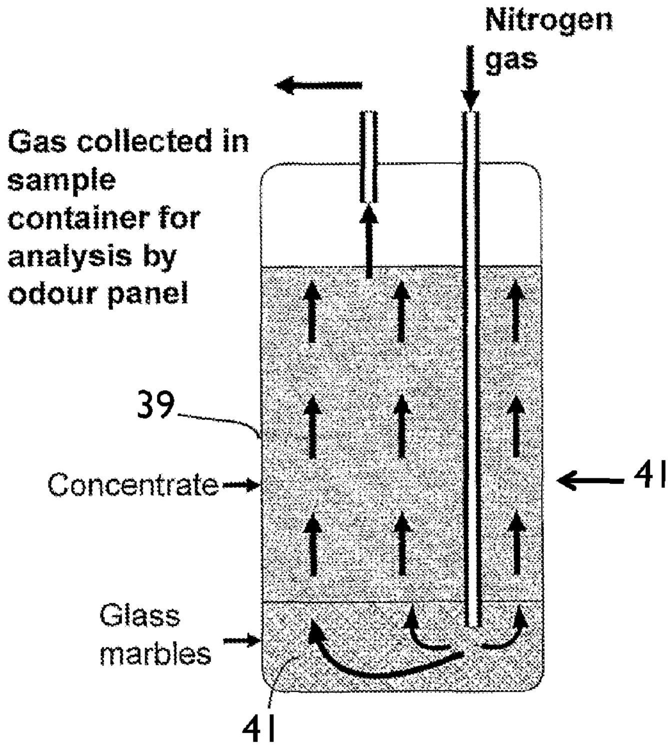
FIG. 4 is a diagram that shows one method for assessing the success of odour mitigation strategies.

3. Odour Generation—The success of odour mitigation strategies, such as the above-described strategies may be assessed by the absence of odours—specifically for moist export concentrate product. One example of a methodology to be conducted by a suitably contracted laboratory is diagrammatically shown in FIG. 4. Moist concentrate 39 (comparison of before and after treatment) may be placed into a vessel 41 o top of a layer of glass marble 41 in the bottom of the vessel and subjected to conditions that are known to give rise to odour generation. The temperature-related mechanisms for odour generation may be simulated by placing the vessel in a 70° C. water-bath with nitrogen gas slowly purging through the concentrate 39 to collect the gas into a gas collection container (not shown). Similarly, the mechanism by which reducing conditions give rise to odours may be simulated by imposing reducing-conditions. Samples may be maintained at room temperatures, flushed with nitrogen. After one week, a sample may the flushed with nitrogen and the gas captured. The collected gas sample may be submitted to an odour panel for an accredited assessment. The odour panel is a controlled and calibrated human olfactory panel. This information may be used as verification of the odour mitigation strategy and may be repeated as required.

Many modifications may be made to the present invention described above without departing from the spirit and scope of the invention.

The invention claimed is:

1. A process for producing a mineral concentrate that is at least a substantially odor-free product from a mined material that comprises:

(a) floating selected mineral particles from a slurry of the mined material and forming a wet concentrate in the form of a froth product slurry containing floated mineral particles, with the flotation step including adding a collector in the form of an organic xanthate compound to the slurry of the mined material, wherein the collector adsorbs onto selected mineral particles and promotes the flotation of the mineral particles, and (b) treating the froth product slurry containing the floated mineral particles by i. heating the froth product slurry containing the floated mineral particles to a temperature of not less than 50° C. to destroy the organic xanthate compound; or ii. adding one or more chemicals to prevent residual organic xanthate compounds or mineral concentrates from being converted to odorous compounds, wherein the one or more chemicals is selected from the group consisting of nitrate, molybdate, activated carbon and mixtures thereof, and thereby facilitate forming a concentrate of the mineral particles with a low organic compound loading.

2. The process defined in claim 1 comprising separating the mineral particles from the froth product slurry, with the separated mineral particles forming the concentrate with the low organic compound loading.

3. The process defined in claim 1 wherein the treatment step (b)(i) further comprises increasing the pH of the froth product slurry containing the floated mineral particles.

4. The process defined in claim 3 further comprising increasing the pH to at least pH 10.

5. The process defined in claim 4 further comprising maintaining the Eh of the froth product slurry containing the floated mineral particles below the formation potential of dixanthogen.

6. The process defined in claim 5 comprises maintaining the Eh below the formation potential of dixanthogen by adding a reductant.

7. The process of claim 6 wherein the reductant is dithionite, sodium sulphide or ammonium sulphide.

* * * * *